Feb. 26, 1935.   J. C. FORTUNE   1,992,746
HYDRAULIC CONTROL FOR ROTARY DRILLS
Filed Oct. 25, 1932   9 Sheets-Sheet 1

INVENTOR
JAMES C. FORTUNE
BY
ATTORNEY

Feb. 26, 1935.     J. C. FORTUNE     1,992,746
HYDRAULIC CONTROL FOR ROTARY DRILLS
Filed Oct. 25, 1932     9 Sheets-Sheet 2
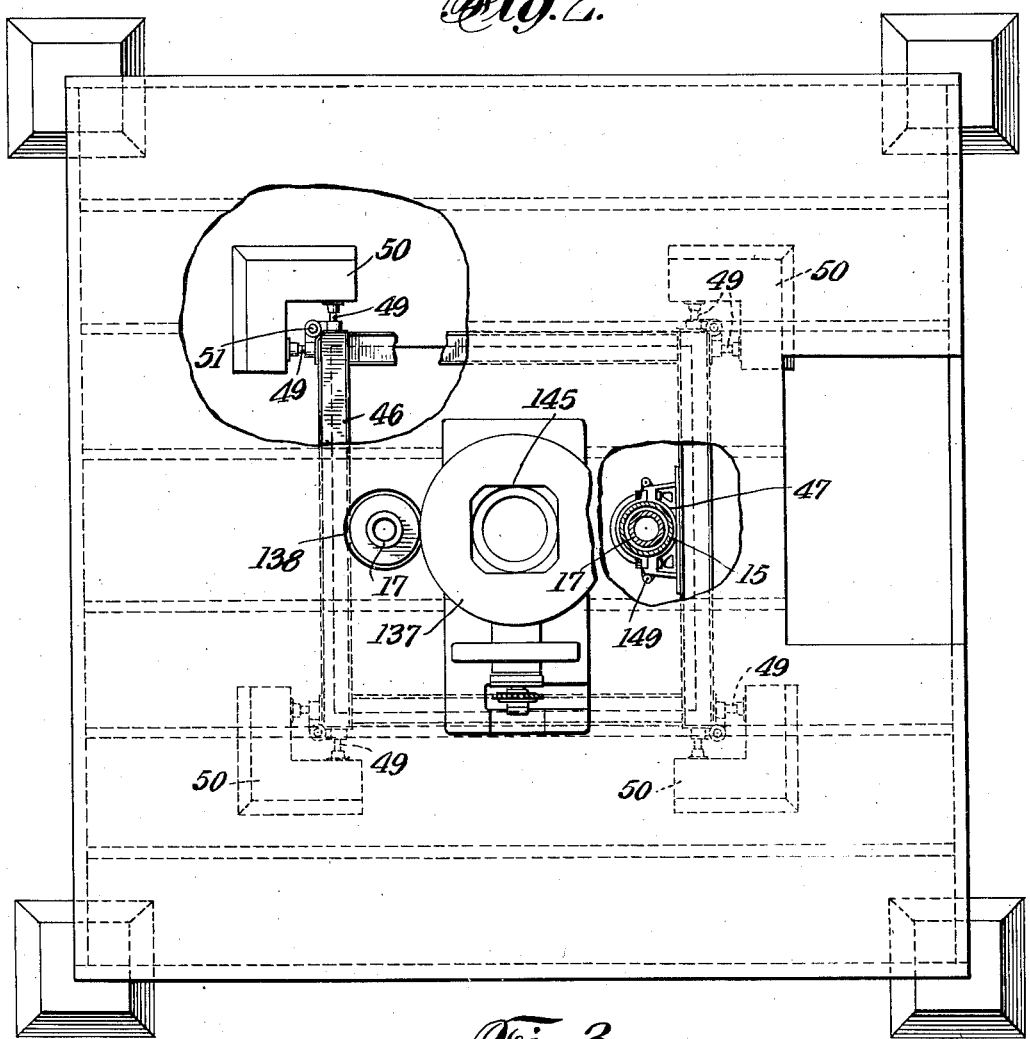
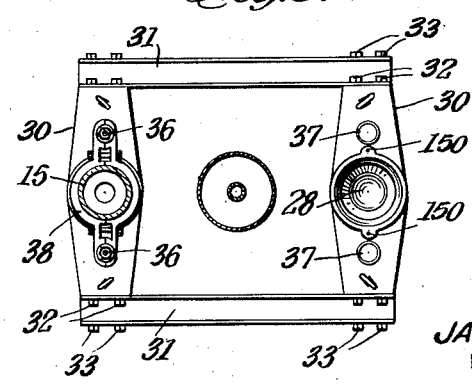
INVENTOR
JAME C. FORTUNE
BY
ATTORNEY

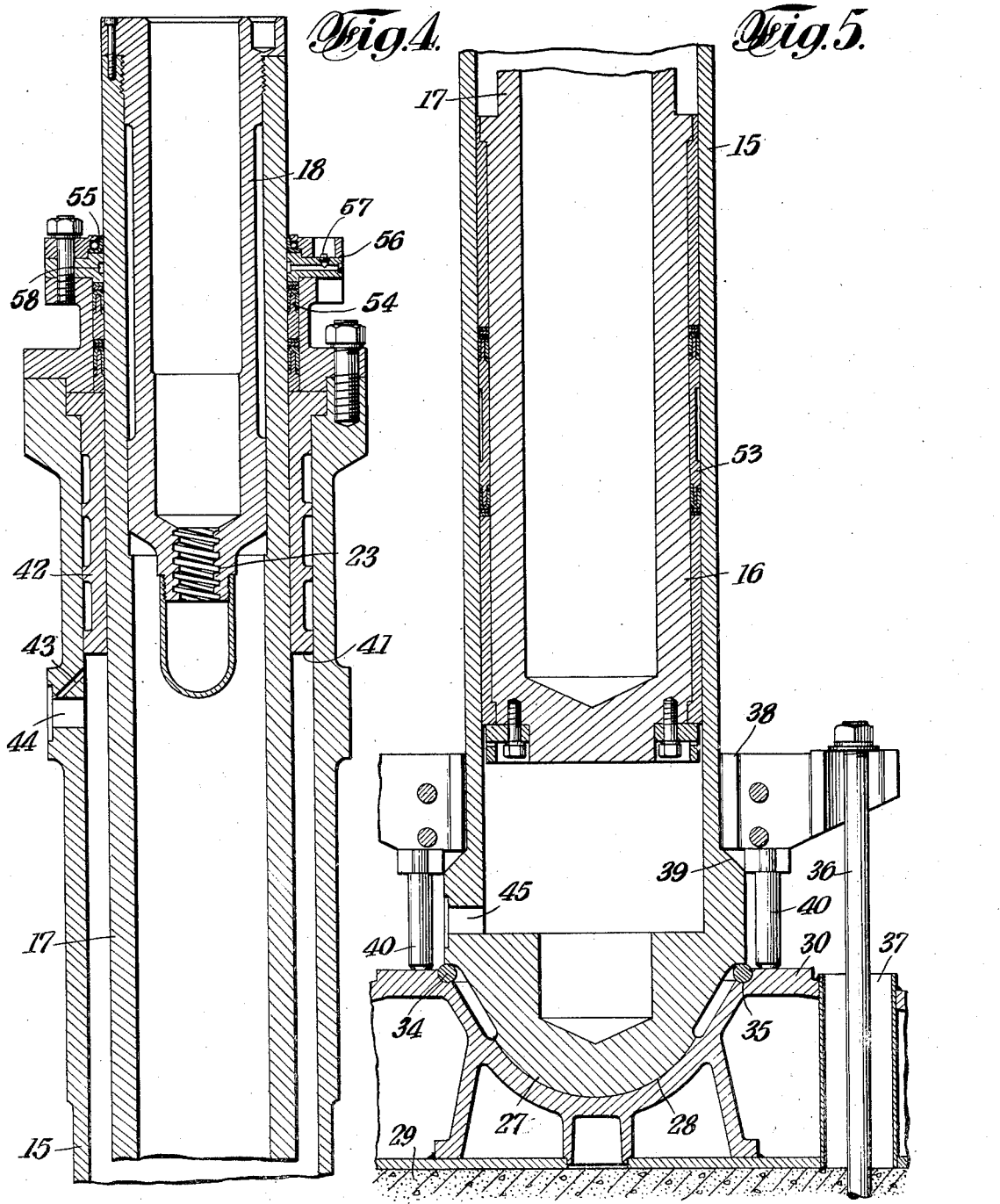

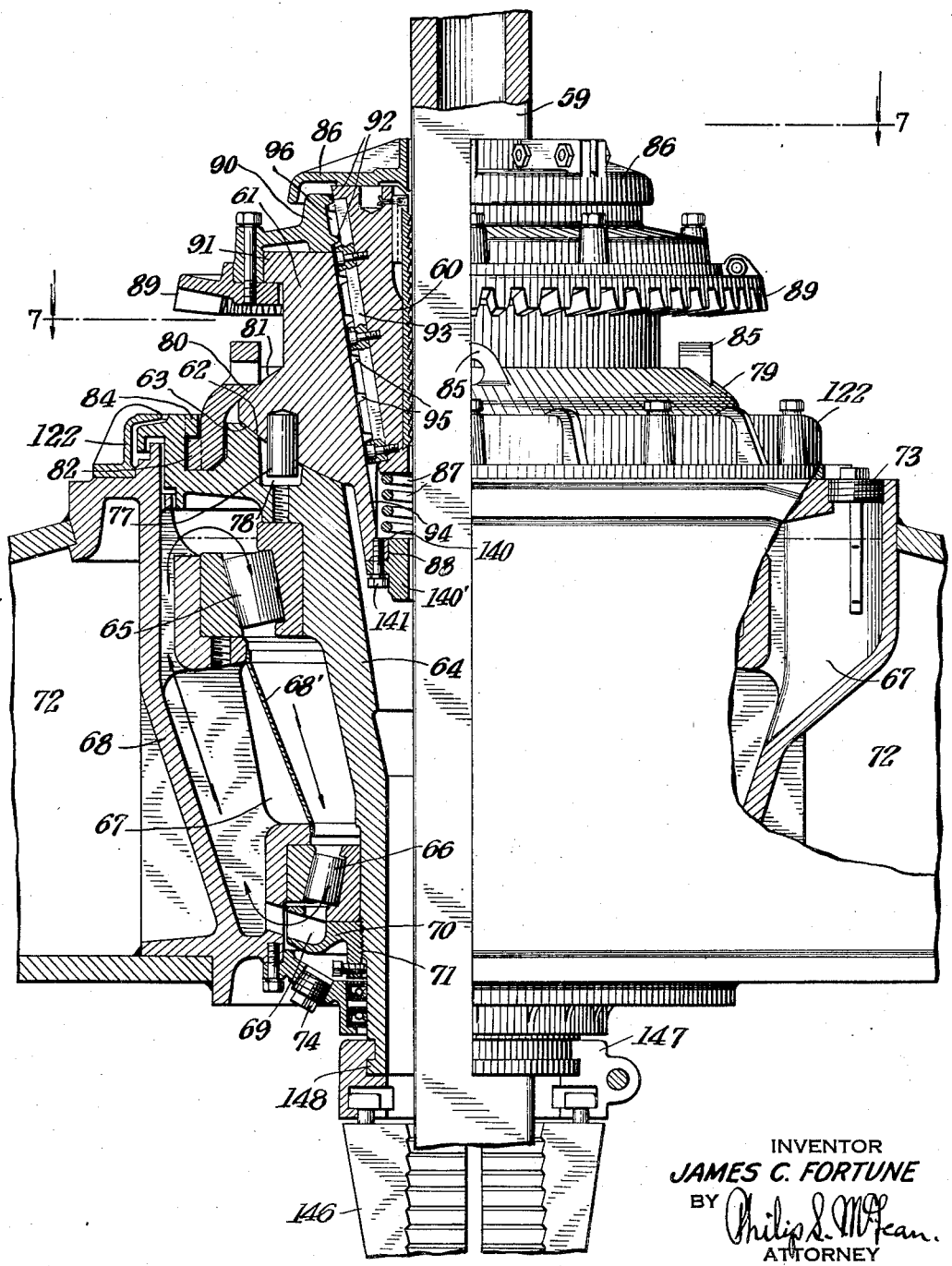

Feb. 26, 1935.　　　J. C. FORTUNE　　　1,992,746
HYDRAULIC CONTROL FOR ROTARY DRILLS
Filed Oct. 25, 1932　　9 Sheets-Sheet 5
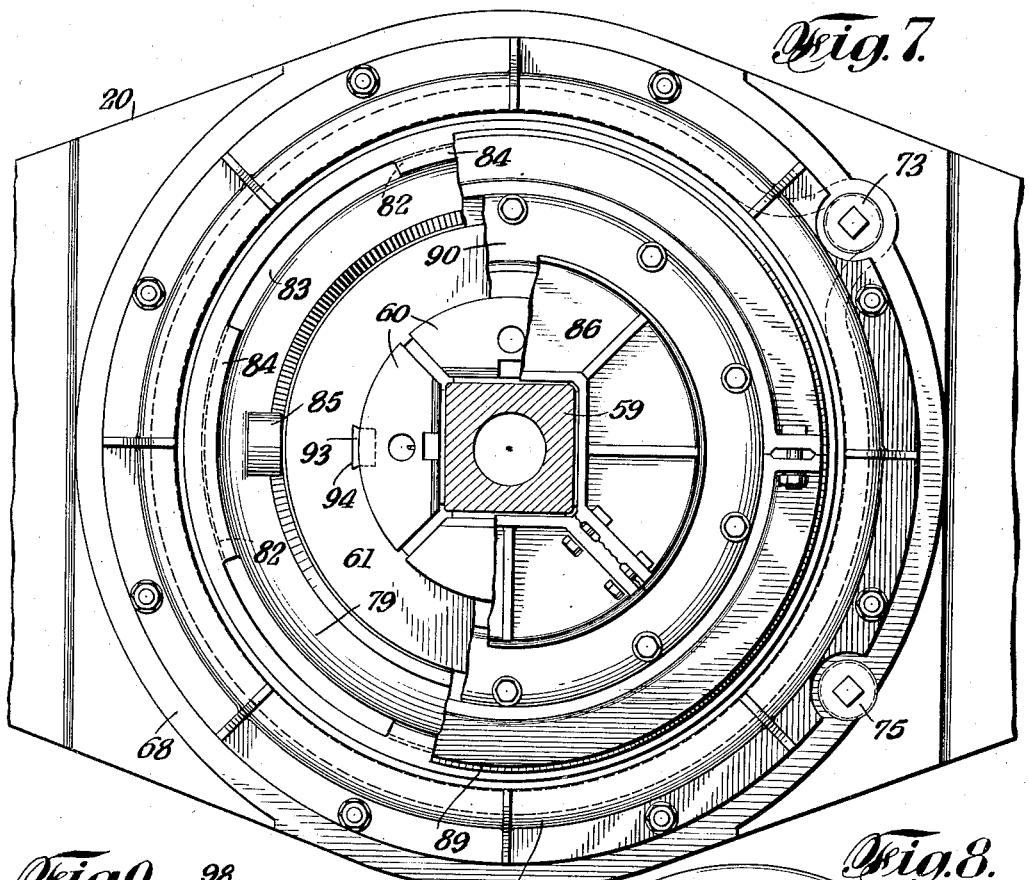
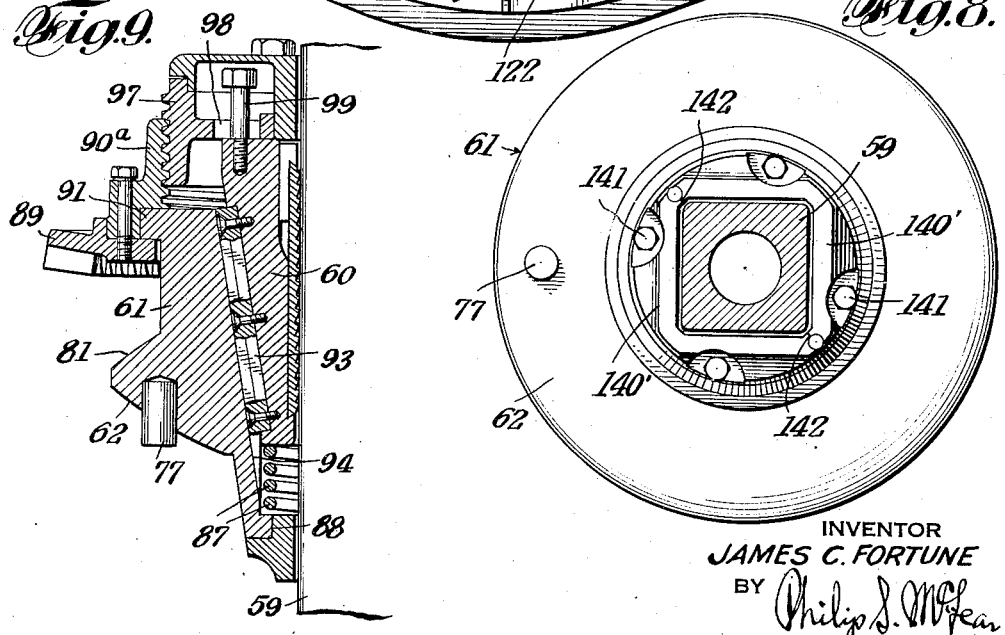
INVENTOR
JAMES C. FORTUNE
BY
ATTORNEY

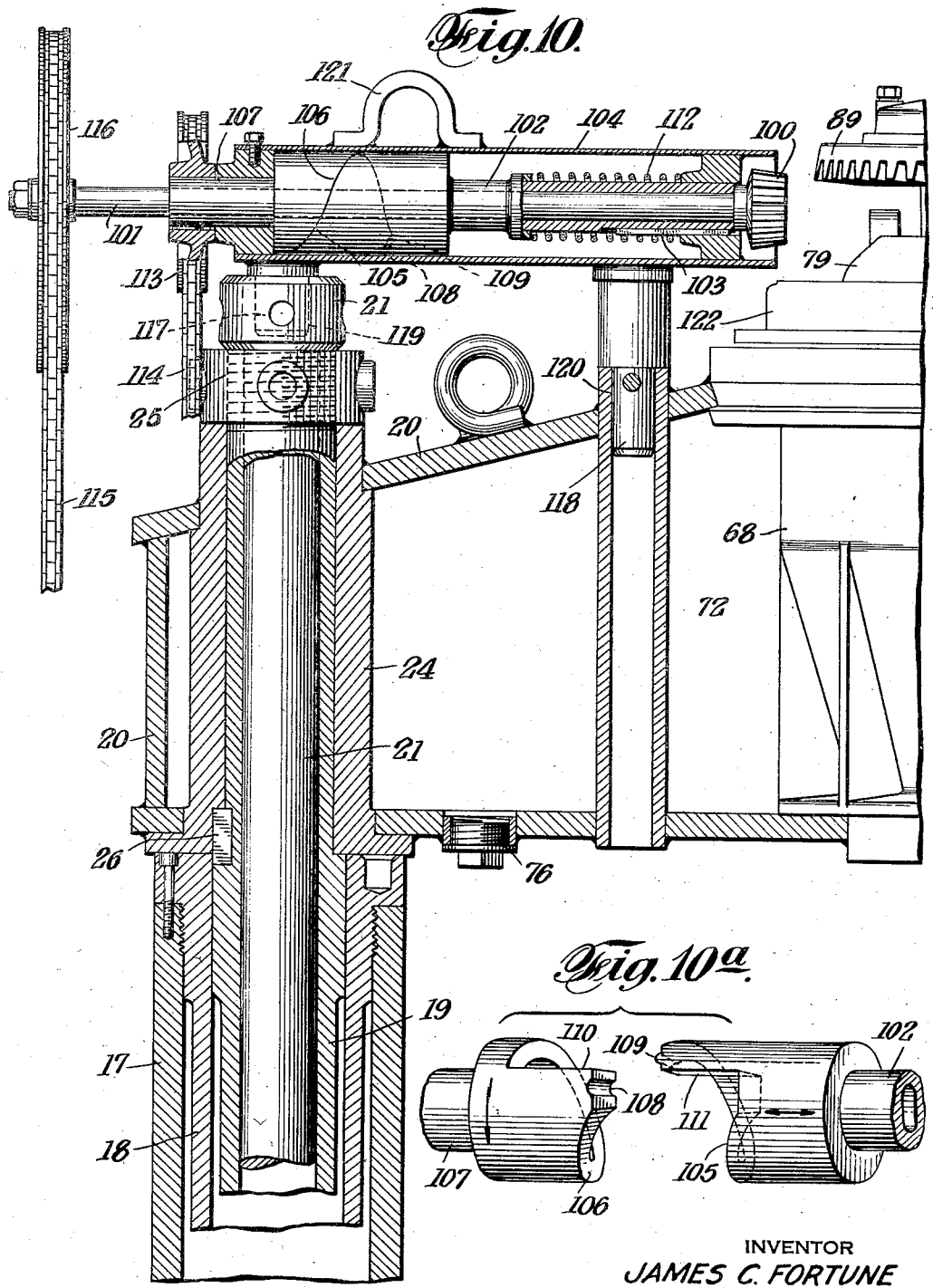

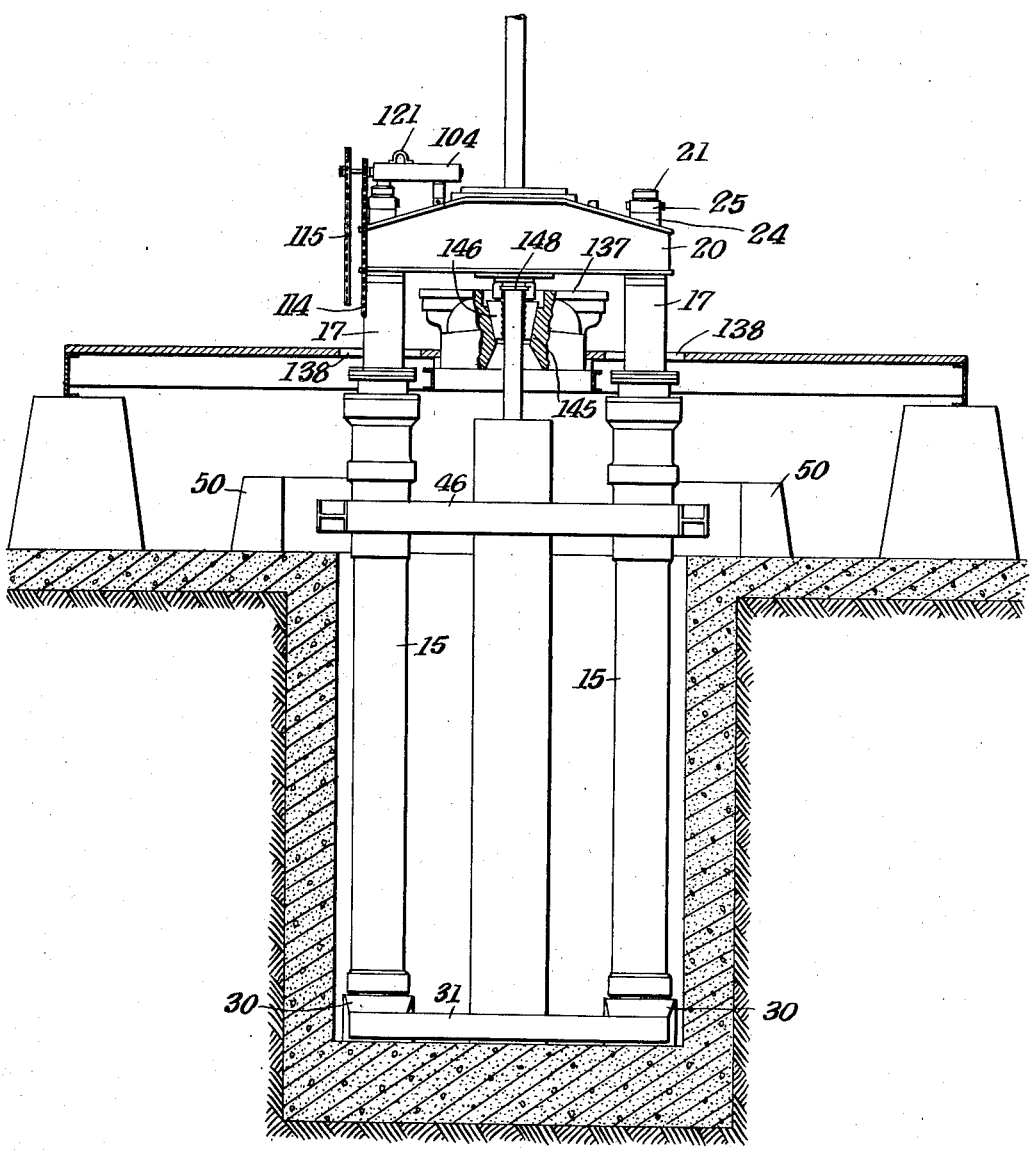

Feb. 26, 1935.   J. C. FORTUNE   1,992,746
HYDRAULIC CONTROL FOR ROTARY DRILLS
Filed Oct. 25, 1932   9 Sheets-Sheet 8
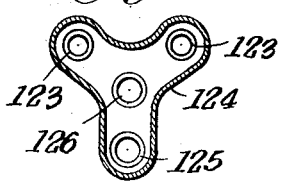
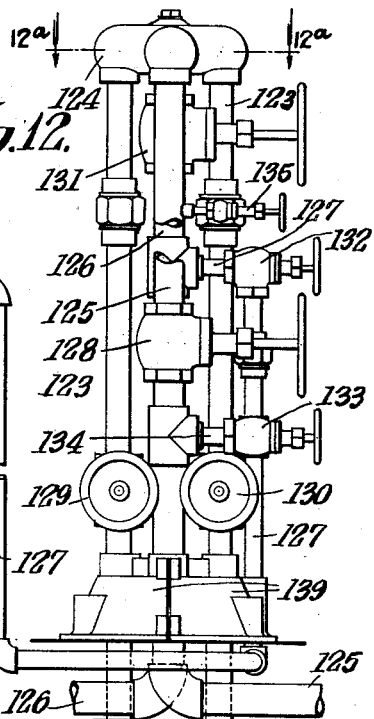
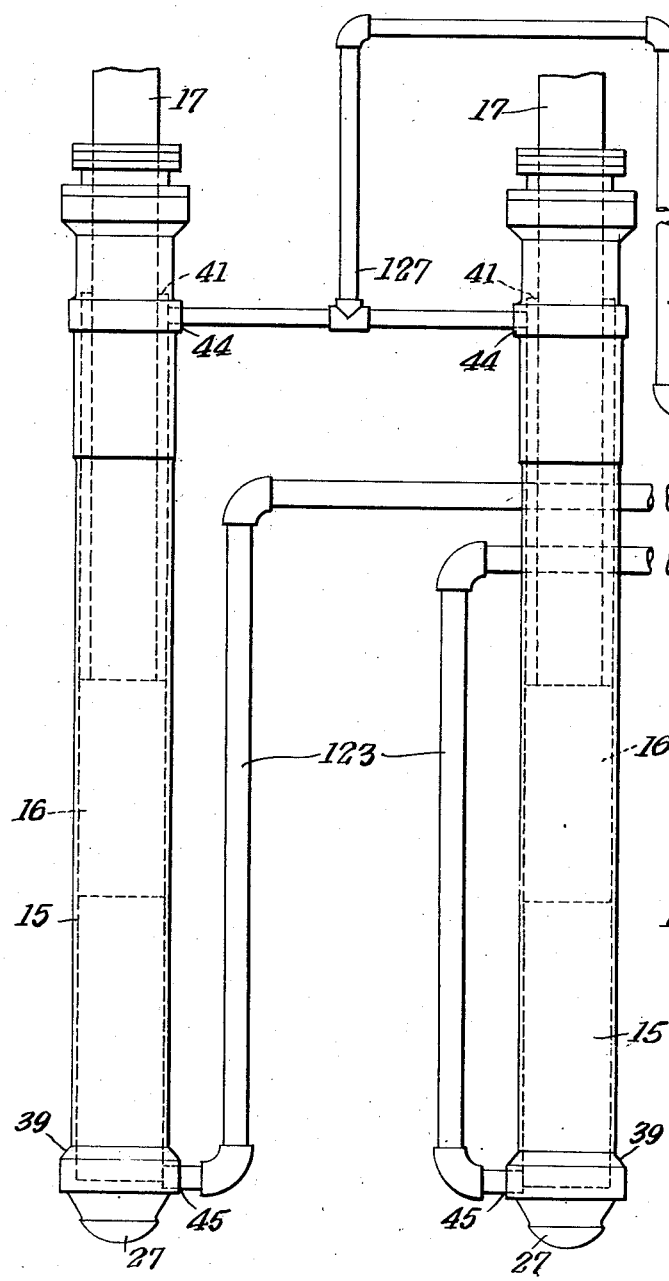
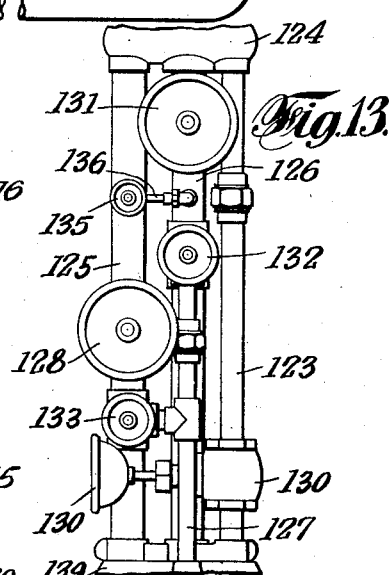
INVENTOR
JAMES C. FORTUNE
BY
ATTORNEY

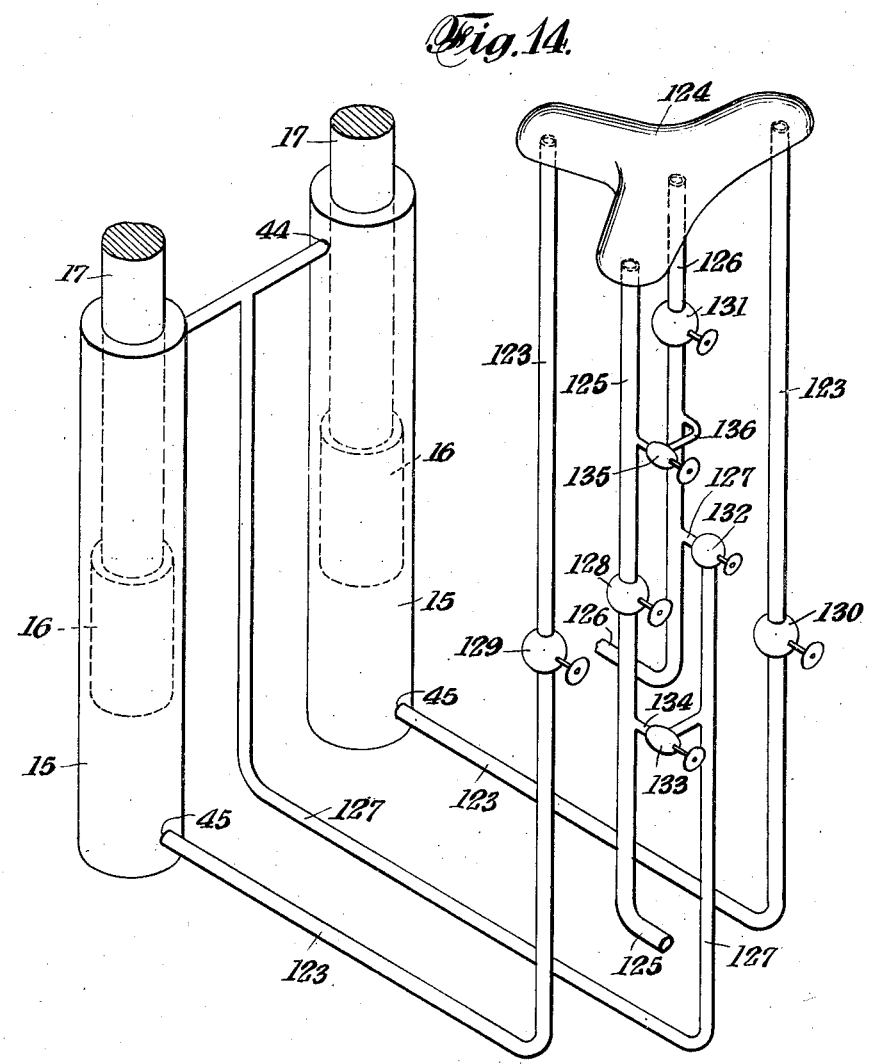

Patented Feb. 26, 1935

1,992,746

UNITED STATES PATENT OFFICE 1,992,746

HYDRAULIC CONTROL FOR ROTARY DRILLS

James C. Fortune, Monterey, Calif.

Application October 25, 1932, Serial No. 639,411

35 Claims. (Cl. 255—22)

This invention relates to hydraulic feed mechanisms of the type broadly covered in United States Patent 1,879,929 of September 27th, 1932.

The objects of the invention are to improve apparatus of this character, particularly in matters of commercial practicability, such as ease of assembly, simplicity, size, weight, accessibility and expense of parts; to facilitate the alignment of the hydraulic with the drill string of the rotary; to enable the kelly or drill pipe being readily held and controlled for pressure feed, snubbing out or other operations and generally to increase the usefulness of such apparatus in the field.

The various novel features of construction, combinations and relations of parts by which the foregoing and other desirable objects are attained will be found set forth in the following specification which is to be read in conjunction with the drawings accompanying and forming part of the same.

The drawings illustrate by way of disclosure, practical commercial embodiments of the invention, but it will be understood that the actual physical structure may be modified as regards these particular illustrations, without departure from the true spirit and broad scope of the invention.

Fig. 1 is a broken and part sectional side elevation of a form of the invention combined with a rotary drill and illustrating the removability of the slip assembly on the kelly or grief stem and the holding of the pipe in the yoke of the hydraulic when a new joint of pipe is to be connected.

Figs. 2 and 3 are broken horizontal sectional views as on lines 2—2 and 3—3 of Fig. 1, showing the relation of the hydraulic to the rotary and derrick structures and the general form of the base frame for the hydraulic rams.

Fig. 4 is an enlarged broken sectional view of the upper portion of one of the hydraulic rams and Fig. 5 is a similar view of the lower portion of the same.

Fig. 6 is a broken vertical longitudinal sectional view of the yoke and self-aligning and removable slip structure.

Fig. 7 is a broken sectional and plan view of the removable slip and yoke structure as on generally the plane of line 7—7 of Fig. 6.

Figure 1:
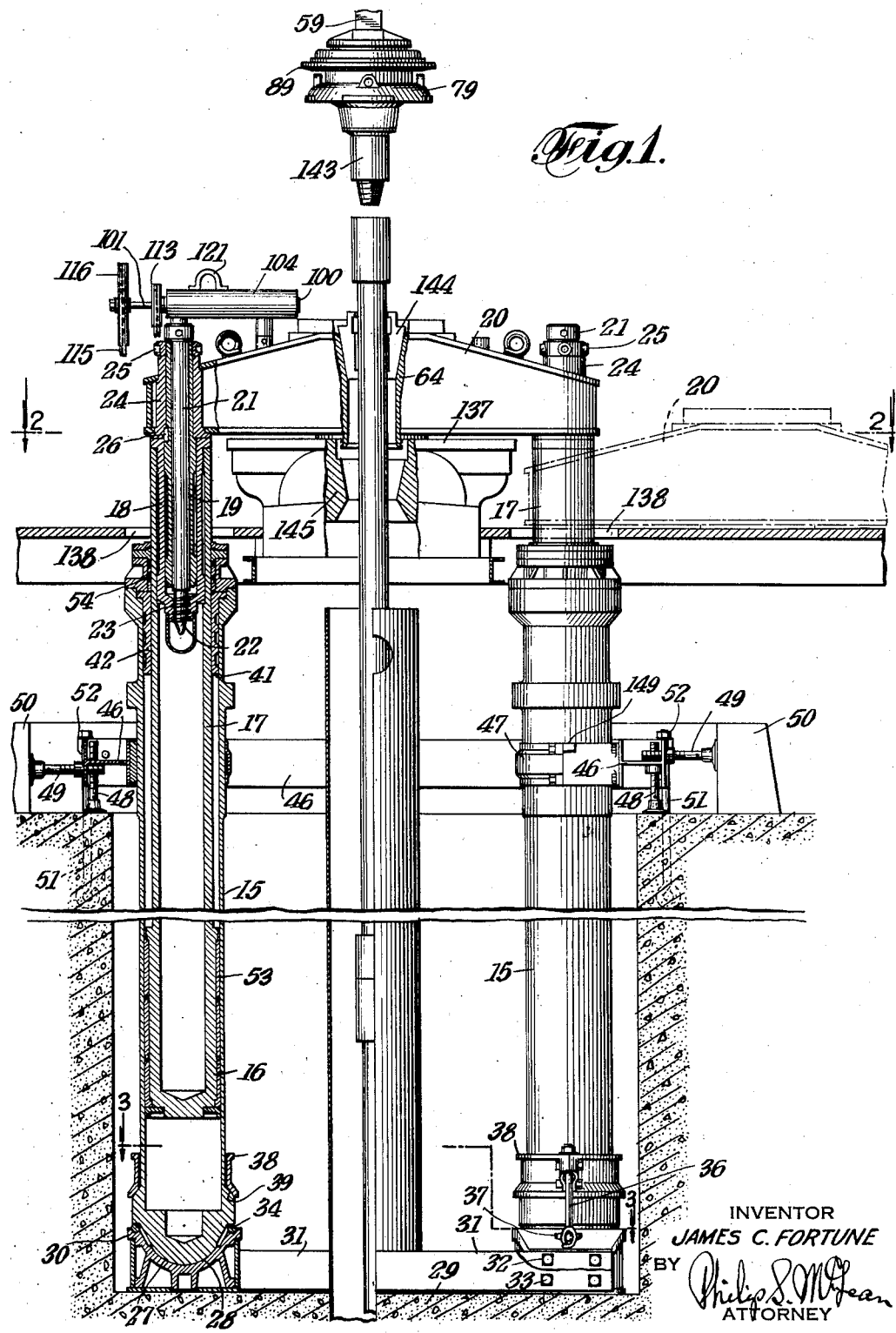

Fig. 8 is a bottom plan view of the self-aligning slip holder 61 with ring gear 89 and sleeve 90 removed and with the kelly appearing in section.

Fig. 9 is a broken sectional detail of a modified form of slip holder and slip release mechanism.

Fig. 10 is a fragmentary sectional view of the retractable operating gear portion of the slip release.

Fig. 10a is a detail of the cams forming part of the same.

Fig. 11 is a broken side elevation, illustrating a use of the invention for holding the pipe in the well against pressure, during snubbing out operations.

Figs. 12 and 13 are broken and somewhat diagrammatic views, illustrating control features of the rams. Fig. 12a is a cross-sectional detail as on line 12a—12a of Fig. 12.

Fig. 14 is a diagrammatic illustration of the hydraulic cylinders and control connections.

In the general assembly views, Figs. 1, 2 and 11, it will be seen that the apparatus comprises a pair of hydraulic rams operating a yoke from which the drill string is suspended in position to be freely turned by the rotary.

The hydraulic rams consist of cylinders 15, with hollow pistons 16 operating therein and having tubular piston rods 17, with sockets 18, screwed in the upper ends of the same to receive the hollow pins 19 of the yoke 20. Headed bolts 21 pass down through these hollow pins and have their lower screw threaded ends 22, engaged in screw seats 23, in the ram sockets 18, to rigidly but removably connect the yoke on the rams. The hollow yoke pins are shown as secured in heavy bosses 24 in the ends of the yoke by nuts 25, and as held against turning in these bosses by keys 26.

The ram cylinders are shown as having ball elements 27 at the lower ends of the same, seating in ball sockets 28 in the base frame. The latter is mounted on the foundation 29 of the cellar and is shown as made up of two base pieces 30, carrying the ball sockets, removably connected together in parallel relation by the H-beam spacers 31. These spacer bars are shown as secured to the ends of the socket members 30 by bolts 32, passing through the side flanges above the webs of the beams and by bolts 33, passing through the outer flanges, below the webs. This provides full accessibility for the use of wrenches and thus enables the base frame to be quickly set up on the cellar floor about the drill string or to be taken down just as readily.

To prevent mud and grit working into the ball sockets for the rams, suitable packing such as indicated at 34 may be seated in companion grooves at 35 in the members of the ball and socket joints.

The rams are held down to their seats in the present disclosure by relatively short stay bolts 36, suitably anchored in the bed or floor of the cellar and extending freely up through passages 37 in the base members 30, to split clamps 38, removably and freely secured about the lower ends of the ram cylinders, with ball and socket journalled engagement at 39, to permit rocking adjustments of the rams. Stop pins 40 on these clamps, by engagement with the base, prevent the stay bolts from being set up so tight as to bind the rams against rocking adjustments.

To limit the up-stroke of the pistons, stop shoulders 41 are provided at the lower ends of the piston rod guide bushings 42 and to check or cushion the pistons and bring them gradually to a stop without hammer, relief ports 43, are shown extending from the stop shoulders 41 to bleed the liquid above the pistons back into the upper ports 44 of the cylinders. These ports are connected with suitable supply and relief piping as will be later described and similarly, the ports 45 in the lower end of the cylinders, are so connected.

The cylinders are lined up on the base by a positioning frame indicated at 46, having split sockets 47, clamped about the upper portions of the ram cylinders and carrying in each corner of the same the vertically acting and two horizontally operating jacks 48, 49, respectively. Special angled or L-shaped concrete abutments 50 are shown provided at the ground level under the derrick about the corners of the positioning frame, as in Fig. 2, to support the vertical jacks and to provide corner walls for the thrust of the angularly related horizontal jacks. It will be evident that by appropriate adjustment of these jacks that the frame may be shifted in various directions and positively fixed to secure the rams in proper alignment.

If desired, the ram positioning frame may be anchored down on the base by stay bolts 51, shown as secured at 52 in the corners of the frame. By the combination of screw means disclosed, the positioning frame may be raised and lowered, or shifted laterally in any direction. Thus any inaccuracies in the foundations may be accurately compensated for and the parts be secured in final alignment by the use of jacks or screw means described.

As shown in Figs. 4 and 5, the pistons of the rams have suitable packing as at 53 and the hollow piston rods operate through suitably packed stuffing boxes 54. To clean the rods as they enter the stuffing boxes and provide proper lubrication, wiper rings 55 may be mounted on the stuffing boxes, on top of the gland rings 56 and the latter may be provided with greasing fittings at 57, communicating with annular grease chambers 58 surrounding the rods. Consequently, as the pistons lower in the cylinders, the rods will first be wiped clean and then be greased as they enter the cylinders.

To promote and assure the free rotation of the drill string suspended from the hydraulic and to free the latter of torque loads, the rotating supporting means for the drill string has a rocking self-aligning mounting in the yoke. This construction is illustrated in Figs. 6, 7 and 8, which show how the kelly or grief stem 59 is gripped by wedge-shaped slips 60, seating in a special spider or holder 61, which has a spherical or rounded undersurface 62, seating in a ball socket 63, carried by the rotating supporting spider 64. The latter is journalled in the yoke on an upper set of roller bearings 65, carrying the downward load and a lower set of roller bearings 66 faced to carry the upward thrust.

The two sets of bearings are shown as operating in an oil bath provided by the chamber 67, between the bearing socket 68, in the yoke and the outer surface of the spider 64. An annular circulation of oil is created between the upper and lower bearings, about the conical partition 68', as indicated by the arrows in Fig. 6, by means of vanes or paddles 69, projecting from the lower bearing adjustment ring 70, which is adjustably secured at 71, on the lower stem portion of the spider. This circulation of oil has added advantages in that it aids in cooling the oil and in carrying away any heat generated in the bearings. Particularly, is this accomplished, where as in the illustration, the yoke is made in hollow form, providing a relatively large chamber 72, surrounding the central passage therethrough and adapted to contain water or any other cooling medium. This hollow construction also is of advantage in keeping down the weight of possibly the largest moving part of the apparatus.

The oil chamber 67 is shown as having a filling plug at 73 and a draining plug 74, Fig. 6 and the surrounding cooling chamber 72, may have a filling plug such as indicated at 75, in Fig. 7, and a draining plug as at 76 in Fig. 10.

To keep the self-aligning slip socket 61 from rotating in its support, it may be provided with a dependent pin or pins 77, freely received in a socket or sockets 78 in the supporting spider.

In order that downward pressure may be applied through the slips, the slip holder 61 is held down in its ball socket, in the present disclosure, by a surrounding ring 79, having a downwardly faced ball seat 80, overstanding the upwardly faced rounded or ball seat 81 on the holder. The slip holder is thus confined without being restricted in its oscillating or aligning movements.

To permit separation of the slip assembly as a unit from the rotating supporting spider, the securing ring 79 is removably connected with the main spider as by means of the breach block joint illustrated and consisting of the segmental lugs 82 on the ring adapted to pass down through cuts 83, Fig. 7, into engagement beneath the confining flange 84 on the rim portion of the spider 64. To facilitate quick turning of the locking ring, the same is shown provided with perforated lugs 85, to receive bars or other turning implements. Keys, or other means may be provided for securing the ring against accidental shifting, but such usually is not necessary because of the wedging action effect in the breach block joint, wherein the companion parts are slightly inclined to tighten down the ring and thereby frictionally secured in position.

To prevent mud and dirt from working down the kelly into the slip socket, a cover of split construction is indicated at 86, Fig. 6, adapted to be placed about the kelly over the tops of the slips. This cover does not interfere with the setting or release of the slips and aids in rendering the action of the slips uniform, in effect balancing the action of the individual slips against the force of the slip releasing spring 87, which is supported by the flange 88, against the lower ends of the slips.

For positively securing and releasing the slips, there may be provided the mechanisms illustrated in detail in Figs. 6 to 10 and comprising a split gear ring 89, rotatably mounted on the slip socket 61 and having a raising and lowering screw connection with the slips.

In the form of the invention shown in Figs. 6, 7, 8, this screw connection is provided by a ring 90, bolted to the top of the ring gear over the confining flange 91, and carrying a widely pitched screw thread 92, designed to cooperate with companion screw elements in the dovetail keys 93, on the backs of the slips and which slide in the undercut or dovetail grooves 94, in the slip socket of the holder 61. These companion screw elements are indicated as thread receiving grooves 95, spaced to match the pitch of the screw thread 93 and a special feature of the same is that at the tops of the slips the metal between adjoining thread receiving grooves is cut away as at 96, to leave a space which will permit limited relative vertical movement of the slips and screw ring. This will be clear from a consideration of Fig. 6, wherein the position of the parts illustrated, the upper and lower turns of the screw thread 92 have a downward bearing on the companion screw elements of the slips, but not not interfere with the slips dropping away from the screw ring in their tightening action on the kelly. In this position, also the screw ring may be turned to release its holding effect on the slips without actually picking them up, this lost motion being equivalent to the cutaway space indicated at 96.

It will thus be understood that the screw ring may be turned to set the slips down in their socket against the kelly and that as the weight of the string comes on the slips they may lower further in the socket, to fixedly grip the kelly without being limited in this self-adjusting movement by the screw ring, the lost motion of the screw permitting this self-seating movement of the slips and preventing the transference of the load on the slips to the screw connection. After the slips have seated themselves, a further turn may be given the screw ring to lock them down in their position.

To release the slips, the screw ring may be simply backed off to the extent of the lost motion 96 in the screw threads and then the slips be actually freed either by lifting the kelly through the draw works or by transferring the weight of the string to the draw works and lowering away the yoke by means of the rams.

The unlocking of the slips, preparatory to freeing them of the kelly as described, is readily accomplished, as at the time, there is no load on the screw ring, the lost motion in the screw threads permitting the screw ring to be backed off far enough for the subsequent release of the slips.

The spring 87, by acting as it does on all the slips, insures absolute centering of the kelly in the spider. In the slip releasing operation, all the slips must be lifted together and one cannot advance ahead of the others and thus throw the kelly off center. Similarly, in the slip setting operation, if one slip should take hold ahead of the others, they will nevertheless all lower together, because the first slip in taking hold will depress the supporting spring immediately causing the others to correspondingly come into gripping engagement with the kelly.

In Fig. 9, the screw connection is modified to the extent of having the rotating screw ring 90a, engage a non-rotating companion screw ring 97, which is slotted at 98, for passage of the headed bolts 99 on the uper ends of the slips. This slotted connection with the slips serves as a key to prevent the screw ring 97 from turning and this ring has a bearing engagement over the tops of the slips to force them down in the socket. The length of the bolts 99 in this instance, determines the lost motion relation between the screw and slips, the operation being generally similar to the construction last described.

The special means for turning the slip setting and releasing screw ring is shown in Fig. 10 as consisting of a pinion 100, which can be projected into mesh with the ring gear 89, when required and which at other times, will be retracted, so as not to interfere in any way with other parts. The shaft 101, carrying this pinion, is journalled in a sleeve 102 slidingly keyed at 103, in a casing 104 and having at its outer end a cam face 105, engageable by a companion cam element 106, carried by a sleeve 107, journalled in the outer end of the casing and rotatable about the pinion shaft. These cam members have companion tongue and groove elements 108, 109, which interlock at the top of the cam movement to releasably hold the pinion shaft in its inwardly projected position with the pinion meshed with the ring gear and adjoining abrupt cuts or drops 110, 111, which, as the cam 106 is turned slightly farther align to permit the sliding sleeve cam 102 to be snapped outward by the spring 112, to quickly unmesh the pinion from the gear.

The shaft projecting cam 106 is shown as operable by a wheel 113, with a pull chain 114, passing over the same and in similar fashion, the pinion shaft is shown as rotatable by a hand chain 115, operating over a sprocket wheel 116, on the outer end of the pinion shaft. These hand chains may be long enough to be within convenient reach of the driller in all possible vertical positions of the yoke.

The hand operated mechanism is made readily removable in the illustration, by providing the casing of the same with dependent studs 117, 118, designed to seat in sockets 119, 120, provided respectively in the upper ends of the locking bolts 21 and in the body of the yoke. The casing 104 is shown as having a suitable hoist connection 121, by which this mechanism may be lifted as a unit off the yoke, or be shifted from a position at one side of the yoke to a position at the opposite side of the same. It will be understood from this also that duplicate hand controlled means may be provided in position for operation by two men at opposite ends of the yoke, the latter being desirable for applying greater power in the setting and the locking down of the slips. To protect the men from the rotating parts on the yoke, a guard ring is indicated at 122, Fig. 6, overstanding the rim of the main rotating support or spider 64.

Suitable control mechanism for the rams is illustrated in Figs. 12, 12a and 13, the same comprising piping and the necessary valves as follows:

Pipes 123 connected with the lower cylinder ports 45 are led up through a control stand to a manifold 124, which has also connected with it a pressure supply pipe 125, from a pump or the like. These three pipes are shown connected with the manifold in triangular relation and from the center of the manifold, a fourth pipe 126, which at times forms the bleed or relief connection, extends. Connected with the latter is the piping 127, which extends to the upper cylinder ports 44.

To raise the pistons in the cylinders, the main valve 128 in the pump line 125 is opened, thereby admitting fluid under pressure to the manifold, which flows by way of piping 123 to the lower ends of the cylinders. At this time, the valves 129, 130, in the individual lines to the lower ends of the cylinders are opened, the main bleed valve 131 in the line 126 is closed against manifold pressure and the valve 132 in the piping 127 is opened to relieve the liquid on top of the pistons through piping 127, into the bleed line 126, below valve 131. At such time also valve 133 in a branch line 134, leading from piping 127 to the pump line 125 is closed and the valve 135 controlling the micrometer connection 136 from the bleed to the pump line is closed. As the pistons close the upper ports 44, Fig. 4, the water trapped above the same serves as a cushion escaping gradually through relief ports 43, preventing the pistons from hammering with metal-to-metal contact against the guide bushings 42.

The downward feed may be controlled either rapidly or slowly by means of the two valves 131 and 135, or by a combination of the two, the pump line valve 128 being closed at the time and valve 132 being opened to prevent drawing of vacuum above the pistons. If downward pressure is desired during this lowering operation, particularly for very accurate pressure feed, the valve 133 may be opened partly or wholly to admit pump pressure through branch 134 and piping 127 on top of the pistons. If further control is required at this time to take care of any excess pump flow not required for the downward pressure, valve 132 may be opened more or less to pass the excess volume of fluid out through the bleed. Thus, the pump may be kept running at a constant speed and only the required volume of water be actually used.

Use of the main bleed valve 131 enables rapid downward feed and the closing of this valve and the use of the smaller by-pass 136 and valve 135, enables what may be considered a micrometric feed. Both these valves may be used in conjunction for further control.

If it is desired to swing the yoke off to one side as indicated in broken lines in Fig. 1, to clear the rotary which is designated 137, for ordinary drilling operations, the rams may be pumped up as described and then with the yoke in elevated position, the pump line valve 128 be closed, the bolt 21 at the side which is to be released be unscrewed, the valve 130 at the opposite cylinder be closed and bleed valve 131 be opened to permit the piston of the unlocked cylinder to drop away from the pin at that end of the yoke. This piston then drops down through the opening 138 in the derrick floor, which then may be covered over with a plate or the like, to leave free working space, and the yoke be swung clear over the table and lowered on the floor at the opposite side.

The base of the control stand is indicated in Figs. 12 and 12a as made in three segments 139, which when secured together clamp the pipe connections rigidly in the relation described.

The self-aligning spider or holder 61 for the slips has an opening 140, Fig. 6, through the lower end of the same large enough to pass the tool joints, so that this slip assembly may be readily engaged over the grief stem. The guide bushing 140', which is removably secured in this opening as by the bolts 141, is of split construction as indicated at 142, Fig. 8, so that it may be readily engaged about the grief stem above the tool joint 143. In such relation, this split bushing, which is shaped to closely fit the stem, serves as an abutment, when engaged by the tool joint, to hang the entire slip assembly on the grief stem. This as indicated in Fig. 1 permits the slip assembly to be lifted out by the kelly when a new joint of piping is being added. In the course of such operations, the pipe in the well may be supported by slips 144, set in the supporting spider 64 in the yoke, from which the self-aligning slip spider has been removed. This main supporting spider 64 may be shaped the same as the master spider 145, in the rotary, so that the slips employed in the rotary may be interchangeably used for the purpose.

The rams may be used for snubbing out against pressure in the well by hanging a set of holding slips 146, from split ring 147, rotatably engaged over flange 148, Fig. 6, on the lower end of the supporting spider 64. With downward pressure on the yoke, these may then be set down in the master spider of the rotary table as in Fig. 11, to hold the pipe against upward pressure, the yoke being used in conjunction with a snubbing bar or the like, in removing the joints of pipe.

To facilitate the lining up of the cylinders, the positioning frame may have plumb line guides as indicated at 149, Fig. 2, which when used in conjunction with the marks 150 on the base frame will show when the frame is correctly lined up over the base.

While certain, at present preferred embodiments of the invention have been herein illustrated and described, it will be appreciated that as the structure of the invention may be modified, the claims are drawn accordingly and terms employed are used in a descriptive rather than in a limiting sense, except possibly as limitations may be required by the state of the prior art.

What is claimed is:

1. Power feed mechanism for rotary drilling, comprising a rotating support for a drill string, a spider having a ball joint mounting in said rotating support, pipe engaging slips carried by said ball joint mounted spider and hold-down means having a ball joint engagement over said spider to retain the latter without interfering with self-aligning adjustments of the same.

2. In apparatus of the character disclosed, the combination of a supporting structure, pipe gripping means having a rotating and self-aligning mounting in said supporting structure and including a ball joint mounted part provided with a substantially spherical retaining surface and an annular retaining member engaged with said substantially spherical retaining surface for removably securing said ball joint mounted part in position.

3. In apparatus of the character disclosed, the combination of a rotatably mounted supporting sleeve provided with a ball socket, a pipe supporting member having the opposing element of a ball joint seated in said socket and a retaining ring mounted on said supporting sleeve and releasably engaged with said ball joint mounted pipe supporting member.

4. In apparatus of the character disclosed, the combination of a rotatably mounted supporting sleeve provided with a ball socket, a pipe supporting member having the opposing element of a ball joint seated in said socket and a retaining ring mounted on said supporting sleeve and releasably engaged with said ball joint mounted pipe supporting member, said retaining ring and said pipe supporting member having the engaging elements of a ball joint to secure said member to the sleeve without restricting self-aligning movements of the same.

5. In apparatus of the character disclosed, the combination of a rotatably mounted supporting sleeve provided with a ball socket, a pipe supporting member having the opposing element of a ball joint seated in said socket, a retaining ring mounted on said supporting sleeve and releasably engaged with said ball joint mounted pipe supporting member, said retaining ring and said pipe supporting member having the engaging elements of a ball joint to secure said member to the sleeve without restricting self-aligning movements of the same, said retaining ring and supporting sleeve having the companion matching elements of a breech block joint and whereby said retaining ring may be quickly released from the supporting sleeve and be removed therefrom by said pipe gripping member.

6. Power feed mechanism for rotary drilling, comprising a vertically operating yoke structure, a spider rotatably mounted in said yoke structure, pipe gripping slips operable in said spider, a ring gear rotatably mounted on said spider and having screw connection with the slips for raising and lowering the same in the spider, a pinion mounted on the yoke structure and provided with means for rotating the same and means for projecting and retracting said pinion into and out of mesh with the ring gear.

7. Power feed mechanism for rotary drilling, comprising a vertically operating yoke structure, a spider rotatably mounted in said yoke structure, pipe gripping slips operable in said spider, a ring gear rotatably mounted on said spider and having screw connection with the slips for raising and lowering the same in the spider, a pinion mounted on the yoke structure and provided with means for rotating the same, means for projecting and retracting said pinion into and out of mesh with the ring gear, said retractible pinion and operating means comprising a unit structure and means enabling the mounting of the same interchangeably on the yoke structure at opposite sides of the ring gear.

8. In apparatus of the character disclosed, the combination of a spider, pipe gripping slips adjustable therein and screw means for raising and lowering said slips in the spider and including cooperating elements having a lost motion relation enabling limited self-adjusting pipe gripping and pipe releasing movements of the slips independent of the screw means.

9. In combination with pipe engaging slips and a spider for the same, screw mechanism on said spider for raising and lowering the slips and including companion parts having a lost motion relation enabling self-seating engagement of the slips, independent of the screw operation.

10. In combination with pipe engaging slips and a spider for the same, screw mechanism on said spider for raising and lowering the slips, including companion parts having a lost motion relation enabling self-seating engagement of the slips, independent of the screw operation and comprising a screw ring having a widely pitched screw thread, the slips having companion screw elements engageable by said screw thread and certain of them having the material therebetween removed to provide the lost motion aforesaid.

11. In combination with a supporting structure, a spider rotatably mounted in the same, individually acting pipe engaging slips slidingly keyed in said spider, slip closing means for simultaneously thrusting the slips downward in the spider and a slip opening spring acting on all the slips and whereby the slips will be opened or closed substantially in unison.

12. In combination with a supporting structure, a spider rotatably mounted in the same, individually acting pipe engaging slips slidingly keyed in said spider, slip closing means for simultaneously thrusting the slips downward in the spider and a slip opening spring acting on all the slips, whereby the slips will be opened or closed substantially in unison, the slip closing means including companion parts having a lost motion connection, whereby the slips may have self-adjusting movements independent of each other.

13. In apparatus of the character disclosed, the combination of a spider, drive kelly engaging slips operable in said spider, said spider having a passage to go over the tool joints of a drill pipe and a sectional bushing removably secured in said spider below the slips and having a passage to slidingly fit a drive kelly but adapted to rest upon the tool joint on the end of the same and thereby to hang the slip assembly on the drive kelly.

14. In combination, a drive kelly provided with a tool joint, a spider having an internal flange at the lower end of the same of a size to pass said tool joint, a coiled spring seated on said flange, slips in the spider supported on said spring, means on the spider for forcing the slips down against the spring and a sectional bushing cooperating with the flange to form a guide for the drive kelly and a stop shoulder engageable with the tool joint to hang the slip assembly on the kelly.

15. In power feed mechanism for rotary drilling, a yoke structure, a supporting sleeve journalled in said yoke structure and having a dependent portion, slips hung from said dependent portion of the supporting sleeve, a spider supported below the yoke to receive said dependently hung slips, power mechanism for raising and lowering the yoke structure and drill pipe supporting means removably mounted in the upper end of the supporting sleeve.

16. In combination with a rotary having a slip receiving spider, a yoke structure vertically movable over the table of the rotary, a supporting spider rotatably mounted in the yoke structure and similar to the spider in the table, slips interchangeably usable in the table spider and in the yoke spider and a universally adjustable slip spider removably mounted in the rotatable yoke spider.

17. Power feed mechanism for rotary drilling, comprising cylinders having pistons operating therein and provided with projecting socketed piston rods, a yoke structure, hollow pins dependent from said yoke structure for engagement in the socketed piston rods, securing bolts extending down through said hollow pins for removably securing the pins on the piston rods, said securing bolts having sockets in the upper ends of the same, drill pipe engaging slips swivelled in the yoke and slip releasing gear including a detachable operating unit interchangeably engageable in the sockets in the upper ends of the securing bolts at different sides of the yoke.

18. In apparatus of the character disclosed, a drive kelly, a spider, a bushing in the lower end of said spider shaped to slidingly fit the kelly and thereby to center the kelly in the spider, kelly engaging slips independently movable in the spider, a spring in the foot of the spider acting on all of the slips and a screw ring on the top of the spider for acting on all the slips, said screw ring having lost motion connections with the individual slips, enabling the screw ring to seat the slips in the spider against the kelly and then leave the slips free to "settle" in the spider in self-adjusting fit with the kelly and operable in a reverse direction to free the slips of any holding force other than the weight of the kelly and effective when such weight is relieved to pick up the slips and positively shift them away from the kelly.

19. Apparatus of the character disclosed, comprising in combination, a supporting structure, a sleeve journalled in said supporting structure, a spider having a self-aligning universal joint mounting in said rotatably supported sleeve and pipe engaging slips operable in said self-aligning spider.

20. Apparatus of the character disclosed, comprising in combination, a supporting structure, a sleeve journalled in said supporting structure, a spider having a self-aligning universal joint mounting in said rotatably supported sleeve, pipe engaging slips operable in said self-aligning spider, said self-aligning spider being removably seated in said rotatable sleeve and readily releasable means carried by said sleeve for removably retaining said self-aligning spider in its seat in the sleeve.

21. Apparatus of the character disclosed, comprising in combination, a supporting structure, a sleeve journalled in said supporting structure, a spider having a self-aligning universal joint mounting in said rotatably supported sleeve, pipe engaging slips operable in said self-aligning spider, said self-aligning mounting including companion ball and socket elements and a pin or pins on one of said ball and socket elements and a socket or sockets in the other of said ball and socket elements loosely receiving said pin or pins to thereby cause the supporting sleeve to rotate with the slip spider, while permitting tilting movements of the slip spider in the rotation of the same with the supporting sleeve.

22. Apparatus of the character disclosed, comprising in combination, a rotatably mounted spider, pipe engaging means carried thereby, a gear, connections from said gear to said pipe engaging means and whereby the latter are shifted by movement of said gear, actuating means connectible with and disconnectible from said gear and means for effecting operation of said actuating means and for effecting the connection with and disconnection of same from said gear.

23. In combination with a spider and slips carried thereby, slip operating means including a gear mounted on said spider, a pinion for turning said gear and means for mounting said pinion in retractible relation shiftable into and out of meshed relation with the gear.

24. In combination, a support, a pinion shaft mounted thereon, cam mechanism for effecting longitudinal shifting of said pinion shaft, a pinion carried by said shaft, a gear engageable by said pinion in one position of the shaft, pipe engaging slips, a mounting for said slips and operating connections from said gear to said slips for effecting movement of the latter upon operation of said gear.

25. In combination, a supporting structure, a shaft journalled in and longitudinally shiftable of the same, cam sleeves surrounding said shaft, one being relatively rotatable and the other slideable longitudinally of the shaft and the two having cooperating cam elements, whereby upon rotation of one, the other will be shifted longitudinally and the latter being connected with the shaft to effect longitudinal shifting movement of the shaft, a gear on the shaft, pipe engaging slips, a mounting for said slips and a gear connected to operate said slips and positioned for engagement by the gear on the shaft in one position of the latter.

26. In combination, a supporting structure, a shaft journalled in and longitudinally shiftable of the same, cam sleeves surrounding said shaft, one being relatively rotatable and the other slideable longitudinally of the shaft and the two having cooperating cam elements, whereby upon rotation of one, the other will be shifted longitudinally and the latter being connected with the shaft to effect longitudinal shifting movement of the shaft, a gear on the shaft, pipe engaging slips, a mounting for said slips, a gear connected to operate said slips and positioned for engagement by the gear on the shaft in one position of the latter and means for releasably retaining the shaft in the position with the gear on the same engaged with the gear for operating the slips.

27. In combination, pipe engaging slips, a mounting for the same, a gear connected to operate said slips, a pinion for rotating said gear, a shaft mounting said pinion, a pinion positioning sleeve surrounding the shaft and shiftable to carry the pinion into mesh with the slip operating gear, a sleeve rotatable about the shaft and cooperating cam elements on said rotatable sleeve and said longitudinally shifting sleeve.

28. In combination, pipe engaging slips, a mounting for the same, a gear connected to operate said slips, a pinion for rotating said gear, a shaft mounting said pinion, a pinion positioning sleeve surrounding the shaft and shiftable to carry the pinion into mesh with the slip operating gear, a sleeve rotatable about the shaft, cooperating cam elements on said rotatable sleeve and said longitudinally shifting sleeve, said rotating sleeve having externally disposed means for actuating the same and the shaft projecting from said sleeve and having externally located means for rotating the same.

29. In apparatus of the character disclosed, the combination of a spider, slips operable in said spider, said spider having a passage to go over the tool joints of a drill pipe and a bushing secured to the spider below said slips and having a passage of smaller size than the spider passage, whereby to engage a tool joint on the pipe and thereby hang the slip assembly on the same.

30. In combination, a vertically movable rotatably mounted supporting sleeve, drill pipe supporting means removably mounted in the upper end of said sleeve, pipe slips hung from the lower end of said supporting sleeve and a spider supported below and independently of said sleeve in position to receive said dependently hung slips upon lowering movement of said supporting sleeve.

31. In combination with the hydraulic rams of a power feed mechanism for rotary drilling, a yoke structure, connections between said yoke structure and ram and including sockets at the top of the yoke, drill pipe engaging slips swivelled in the yoke and slip releasing gear including a detachable operating unit removably engageable in said sockets.

32. In rotary drilling, the combination of pipe engaging slips and a spider for the same, a split cover loosely engageable about a pipe held by the slips, said cover riding loosely on said slips and extending out over the spider to carry mud draining from the pipe over and away from the slips and spider and to serve as an equalizer resting on the slips.

33. In rotary drilling, the combination of pipe engaging slips, a spider holding said slips, means associated with said spider for shifting said slips therein and a loose cover resting loosely on said slips for equalizing the action of the slip shifting means, said cover having a central opening for loosely receiving pipe held by the slips and extending away from said central opening over the slips and spider for draining mud from the pipe off the slips and spider.

34. In apparatus of the character disclosed, a spider, pipe holding slips shiftable in said spider, spring means acting on all the slips for shifting the same in a pipe releasing direction and a slip covering ring resting loosely on all the slips for equalizing the effect of the same on the slip releasing spring means.

35. In apparatus of the character disclosed, a spider, slips independently movable in said spider, spring means acting on said slips and a screw ring acting on all said slips, said screw ring having lost motion connections with the individual slips enabling the screw ring to seat the slips in the spider and then leave the slips free to settle in the spider and operable in a reverse direction to free the slips and to positively shift them in a releasing direction.

JAMES C. FORTUNE.